United States Patent Office 2,997,912
Patented Aug. 29, 1961

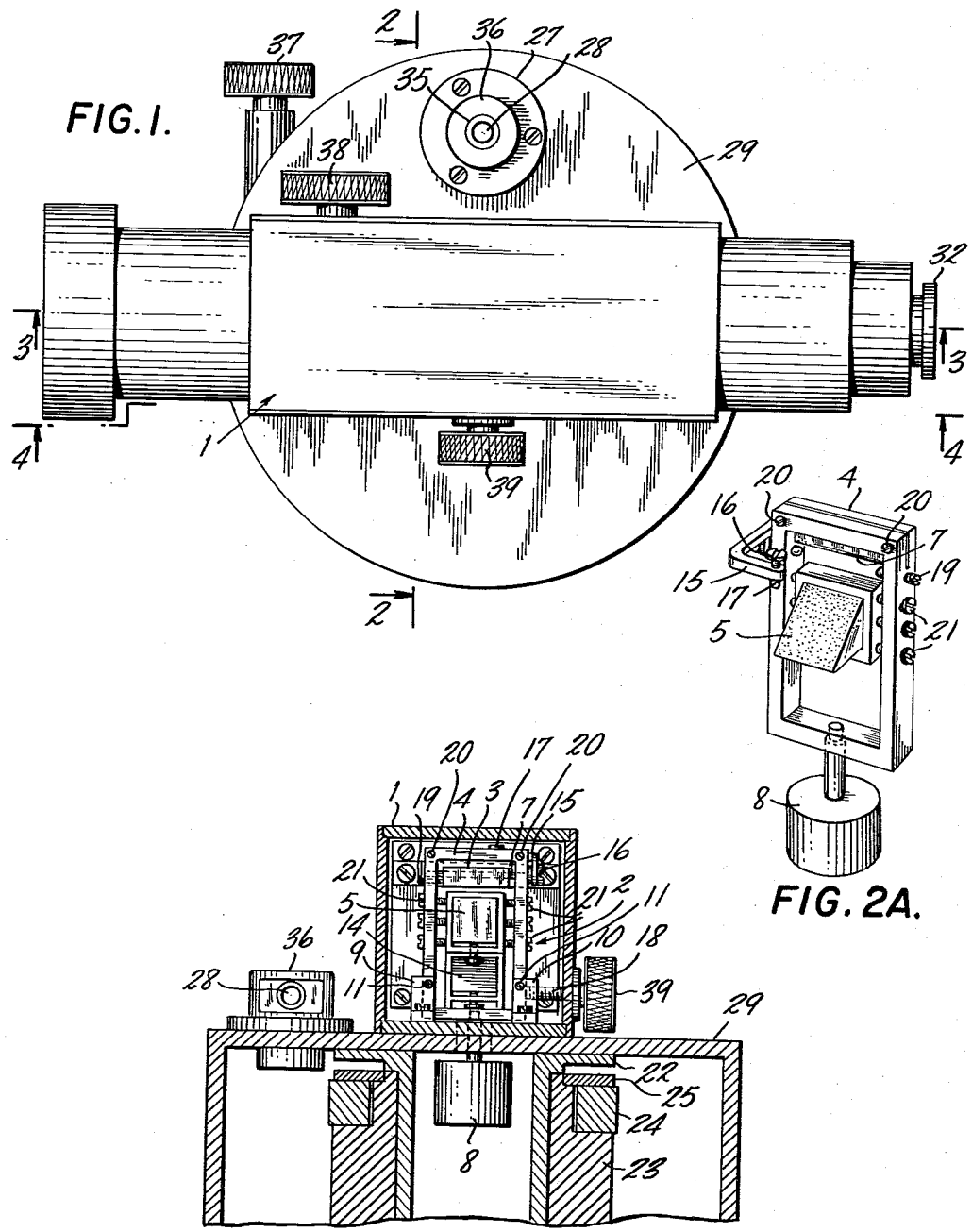

2,997,912
SELF-LEVELING SURVEYING INSTRUMENTS
Vasilije Mikic, Richmond Hill, N.Y.
(134—19 95th St., Ozone Park 17, N.Y.)
Filed Apr. 24, 1958, Ser. No. 730,701
1 Claim. (Cl. 88—1)

This invention relates to surveying instruments and more particularly to self-leveling levels used in surveying. In surveying work the setting up and adjusting the conventional level in level line with the necessary accuracy with the use of the conventional spirit level and adjusting of tilting screws is a laborious and time-consuming operation which has to be repeated every time the instrument is set up in a new location. For this reason, attempts have been made in the past to create such a level which is self-leveling by the use of a prismatic telescope system in which part of the prismatic system was freely suspended on three or more wires. These instruments, however, did not become popular because of the difficulty of the adjustment of the suspended prism and the delicacy of the arrangement which made it extremely sensitive to damage in handling or transportation of the instrument.

The purpose of the invention is to create a self-leveling level which is sturdy in construction, easily resists the unavoidable shocks to which the instrument is subject in transportation; which is extremely accurate, easy to manufacture, simple to adjust and which will withstand, without any impairment of accuracy the handling and transportation shocks. Other purposes of the invention and advantages of the construction will be apparent from the following specification when considered in connection with the drawings attached hereto and forming part of this specification in which:

FIG. 1 represents a top view of a self-leveling level embodying my invention;

FIG. 2 is a section taken on FIG. 1 along the line 2—2;

FIG. 2A is an enlarged view in perspective of the pendulum part of the device which is movably suspended inside of the instrument.

Like numerals refer to identical parts throughout the drawings.

Figure 3:
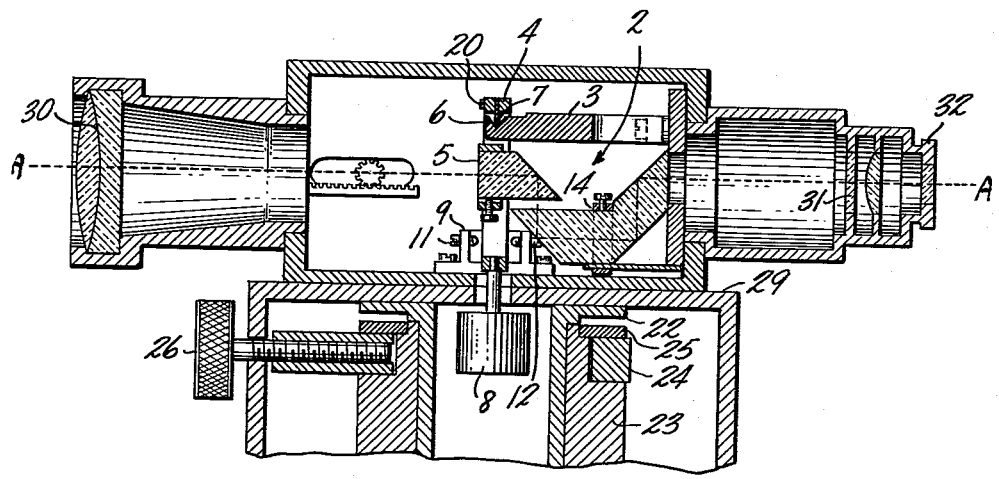
FIG. 3 is a section of FIG. 1 taken along lines 3—3.
Figure 4:
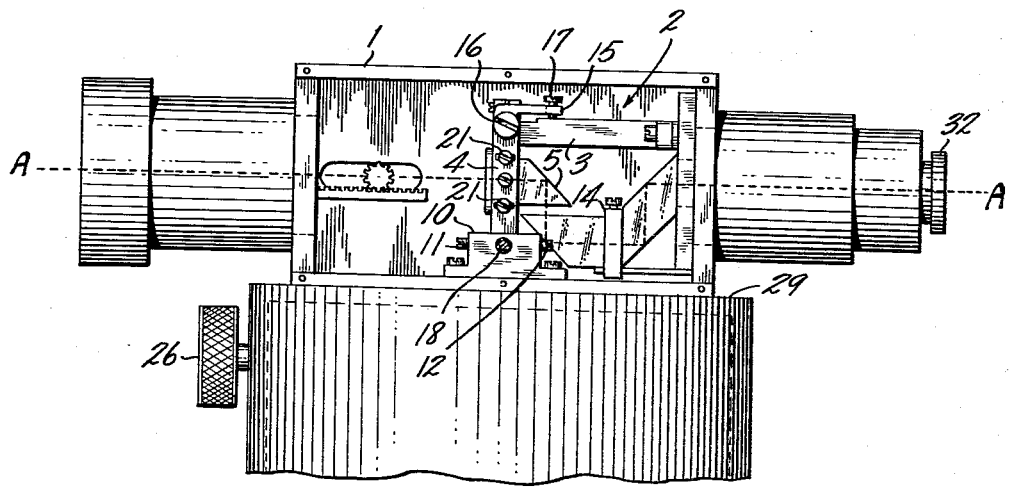
FIG. 4 is a section taken along line 4—4 of FIG. 1.

Basically, my invention consists of a prismatic telescope 1 for a self-leveling level in which the prism system consists of two parts; one part 14 which is rigidly mounted to and integral with the housing of the telescope 1 itself while the other part of the prism system 5 is movably suspended inside said telescope 1 by means of frame 4 which is provided with a steel knife 7 and the weight 8. Said knife 7 fits into groove 6 rigidly mounted on the inside of the telescope housing 1 at exactly a right angle to the optical axis of the telescope A—A.

FIG. 2A shows separately the entire pendulum system with the movably suspended portion of the device which can swing therefore only in the direction of the optical axis of the telescope, no lateral movements being possible through this arrangement. The weight 8 attached to the bottom of frame 4 imparts to the frame, a high vertical accuracy and counteracts completely the any way very slight friction between knife 7 and groove 6. To avoid excessive swinging of frame 4 its movements inside of the telescope are restricted by adjustable screws 11 and 12. Furthermore, means are provided to damp the oscillations of frame 4 and to bring it rapidly to a standstill. This means consists in the embodiment shown, of arm 15 which is movably attached to frame 4 by hinge 16 and is provided with the adjustable screw 17. When the pendulum unit shown on FIG. 2A is assembled inside of the telescope housing 1, this screw 17 slides on the top of a protruding smooth surface 3 attached to the housing 1 thereby effecting a braking and damping effect on the oscillations of the suspended prism 5. When not in use, th swinging of the pendulum shown in FIG. 2A can be stopped by tightening the screw 39, the result of which will be the arresting of the pendulum unit in a fixed position and preventing it from moving relative to the housing 1. This is important in case of transportation.

As shown in the drawings, the conventional spirit level 35 is also provided, but is needed only for a rough and approximate setting up of the instrument within the limits set for the swinging of the pendulum unit by adjusting screws 11 and 12. Once such a rough set up has been attained, the self-leveling feature of the device becomes operative without any annoying and time-consuming meticulous adjustment of screws and tilting devices. Of course, the telescope is also provided with the usual and conventional focusing and adjusting means and provisions are also made for an accurate setting of the prism system, including both the movably suspended and also the firmly attached components of the prism system.

Of course, changes in construction and in the arrangement of parts may be made and different reflecting elements such as mirrors may be substituted for the prisms mentioned hereinabove without departing from the spirit of the invention, which is not limited to the embodiment described above, but defined by the following claim.

I claim as my invention:

A surveying instrument comprising a housing, a prismatic optical system in said housing, said optical system comprising a first optical component fixedly mounted in said housing and a second optical component movably related to said first optical component, means for mounting said second optical component comprising a frame member disposed vertically within said housing, pendulum means at the lower end of said frame member, horizontally disposed pivot means at the upper end of said frame located at right angles to the optical axis of said optical system, said pivot means comprising an elongated knife edge member, rectilinear fulcrum means comprising a member fixed within said housing and formed with an elongated groove to receive said knife edge member whereby oscillation of said second optical component is limited to a single vertical plane, oscillation damping means comprising an arm member pivotally mounted at one end thereof on said frame member, said housing including a planar abutment surface portion in opposed relation to the free end of said arm member, an abutment member adjustably mounted on the free end of said arm member for slidably bearing on said abutment surface portion, horizontally disposed stop means adjustably mounted on housing portions in opposed relation to opposite vertical side portions of said frame member for limiting the oscillation of said frame member, and means for locking said frame member against oscillation comprising screw means on said housing for engaging a lower edge portion of said frame member.

References Cited in the file of this patent

UNITED STATES PATENTS

| | | |
|---|---|---|
| 1,891,641 | Habel | Dec. 20, 1932 |
| 2,557,340 | Carbonara | June 19, 1951 |
| 2,633,050 | Baker | Mar. 31, 1953 |
| 2,679,181 | Keuffel et al. | May 25, 1954 |
| 2,741,940 | Drodofsky | Apr. 17, 1956 |
| 2,779,231 | Drodofsky | Jan. 29, 1957 |
| 2,841,047 | Ellenberger | July 1, 1958 |
| 2,843,001 | Werner | July 15, 1958 |
| 2,959,088 | Raentsch | Nov. 8, 1960 |